United States Patent
Gyoten (10) Patent No.: US 12,393,110 B2
(45) Date of Patent: Aug. 19, 2025

(54) OPTICAL MEMBER DRIVING DEVICE AND PROJECTION DISPLAY APPARATUS INCLUDING THE SAME

(71) Applicant: Panasonic Intellectual Property Management Co., Ltd., Osaka (JP)

(72) Inventor: Takaaki Gyoten, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 565 days.

(21) Appl. No.: 17/679,767

(22) Filed: Feb. 24, 2022

(65) Prior Publication Data

US 2022/0283482 A1    Sep. 8, 2022

(30) Foreign Application Priority Data

Mar. 5, 2021  (JP) .................................. 2021-035598

(51) Int. Cl.
  *G03B 21/14* (2006.01)
  *G02B 7/182* (2021.01)
  *H01F 7/08* (2006.01)

(52) U.S. Cl.
  CPC ........... *G03B 21/142* (2013.01); *H01F 7/081* (2013.01); *G02B 7/1821* (2013.01)

(58) Field of Classification Search
  CPC .......... G03B 21/142; G03B 2205/0069; H01F 7/081; H01F 7/0289; H01F 7/066; G02B 7/1821; G02B 26/0875
  USPC .......................................................... 353/22
  See application file for complete search history.

(56) References Cited

U.S. PATENT DOCUMENTS

| | | | |
|---|---|---|---|
| 5,825,545 A * | 10/1998 | Kino | G02B 27/646 359/557 |
| 5,963,393 A | 10/1999 | Rowan et al. | |
| 2007/0086117 A1 | 4/2007 | Lee | |
| 2015/0268538 A1 | 9/2015 | Gyoten | |
| 2015/0277104 A1* | 10/2015 | Hino | G02B 26/0816 359/199.3 |
| 2016/0306269 A1* | 10/2016 | Gyoten | H04N 9/3111 |

(Continued)

FOREIGN PATENT DOCUMENTS

| | | |
|---|---|---|
| CN | 106383377 | 2/2017 |
| JP | 3-150733 | 6/1991 |

(Continued)

*Primary Examiner* — Magda Cruz
(74) *Attorney, Agent, or Firm* — Wenderoth, Lind & Ponack, L.L.P.

(57) ABSTRACT

An optical member driving device includes an optical member that light is incident on; and a plurality of actuators that shift different portions of an outer peripheral edge of the optical member in a traveling direction of the light immediately before the light is incidence. Each of the plurality of actuators includes an arm that rotates about a rotation center line extending in a direction perpendicular to the traveling direction and supports the optical member at a first end of the arm, a conductor that is provided at a second end of the arm and extends in a direction from the second end toward the first end, the conductor being where a current flows, and a magnet pair that is provided to sandwich the second end of the arm at an interval and generates a magnetic field in a direction intersecting with a direction where the conductor extends.

13 Claims, 8 Drawing Sheets

(56) References Cited

U.S. PATENT DOCUMENTS

2017/0003579 A1\* 1/2017 Abe .................. G02B 26/0875
2021/0165238 A1\* 6/2021 Ventura ................ G02B 27/646

FOREIGN PATENT DOCUMENTS

| JP | 2001-305598 | 10/2001 | | |
|----|-------------|---------|---|---|
| JP | 2002-90876 | 3/2002 | | |
| JP | 2006-310138 | 11/2006 | | |
| JP | 2007-115391 | 5/2007 | | |
| JP | 2011-100103 | 5/2011 | | |
| JP | 2012-123116 | 6/2012 | | |
| JP | 2015-104722 | 6/2015 | | |
| JP | 2015-194722 | 11/2015 | | |
| JP | 2018120176 A | \* | 8/2018 | ............. G03B 21/14 |
| JP | 2021-505951 | 2/2021 | | |

\* cited by examiner

OPTICAL MEMBER DRIVING DEVICE AND PROJECTION DISPLAY APPARATUS INCLUDING THE SAME

BACKGROUND

1. Technical Field

The present disclosure relates to an optical member driving device that shifts a projection position of image light, and a projection display apparatus including the optical member driving device.

2. Description of the Related Art

For example, Patent Document 1 discloses an optical member driving device that shifts an image by changing an orientation of parallel plate glass through which image light is transmitted. The optical member driving device includes a coupling portion having one end rotatably supporting the parallel plate glass. Each of the plurality of coupling portions supports a different portion of the outer peripheral edge of the parallel plate glass. Further, each of the plurality of coupling portions rotates about a rotation center line passing through a center of the coupling portion. Moreover, the other end of each of the plurality of coupling portions is shifted by a movable portion of an actuator that strokes in a traveling direction of light immediately before its transmission through the parallel plate glass.

Patent Literature 1 described above is Unexamined Japanese Patent Publication No. 2006-310138.

SUMMARY

However, in a case of the optical member driving device described in Patent Literature 1, since the movable portion of the actuator strokes in the light traveling direction, the size of the optical member driving device increases, particularly, the size thereof in the light traveling direction increases.

Therefore, an object of the present disclosure is to reduce the size of an optical member driving device that changes an orientation of an optical member.

In order to solve the problem described above, according to one aspect of the present disclosure, there is provided an optical member driving device including: an optical member that light is incident on; a plurality of actuators that shift different portions of an outer peripheral edge of the optical member in a traveling direction of the light immediately before the light is incidence on the optical member. Each of the plurality of actuators includes an arm that rotates about a rotation center line extending in a direction perpendicular to the traveling direction and supports the optical member at a first end of the arm, a conductor that is provided at a second end of the arm and extends in a direction from the second end toward the first end of the arm, the conductor being where a current flows, and at least one magnet pair that is provided to sandwich the second end of the arm at an interval and generates a magnetic field in a direction intersecting with a direction where the conductor extends.

Further, according to another aspect of the present disclosure, there is provided a projection display apparatus including: a light source; a light modulation element that converts light from the light source into image light; the optical member driving device described above that the image light from the light modulation element is incident on; and a projection lens that projects the image light emitted from the optical member driving device.

According to the present disclosure, it is possible to reduce the size of an optical member driving device that changes the orientation of the optical member.

DETAILED DESCRIPTIONS

An optical member driving device according to an aspect of the present disclosure includes: an optical member on which light is incident; a plurality of actuators that shift different portions of an outer peripheral edge of the optical member in a traveling direction of the light immediately before the light is incidence on the optical member. Each of the plurality of actuators includes an arm that rotates about a rotation center line extending in a direction perpendicular to the traveling direction and supports the optical member at a first end of the arm, a conductor that is provided at a second end of the arm and extends in a direction from the second end toward the first end, and through which a current flows, and at least one magnet pair that is provided to sandwich the second end of the arm at an interval and generates a magnetic field in a direction intersecting with a direction where the conductor extends.

According to such an aspect, it is possible to reduce the size of the optical member driving device that changes the orientation of the optical member.

For example, the conductor may be a coil including a first linear portion extending from the second end of the arm toward the first end and a second linear portion extending parallel to the first linear portion. In this case, the at least one magnet pair described above includes a first magnet pair that is provided to sandwich the first linear portion and generates a magnetic field in a direction intersecting with an extending direction of the first linear portion, and a second magnet pair that is provided to sandwich the second linear portion and generates a magnetic field in a direction opposite to the direction of the magnetic field of the first magnet pair.

For example, the optical member driving device may include an elastic member that is connected to the first end of the arm and supports the optical member.

For example, the optical member may have a circular shape as viewed in the traveling direction, and the plurality of actuators may be provided at intervals of 90 degrees as viewed in the traveling direction.

For example, the optical member may be parallel plate glass through which light is transmitted.

Further, a projection display apparatus according to another aspect of the present disclosure includes: a light source; a light modulation element that converts light from the light source into image light; the optical member driving device described above on which the image light from the light modulation element is incident; and a projection lens that projects the image light emitted from the optical member driving device.

According to such an aspect, it is possible to reduce the size of the projection display apparatus.

Hereinafter, an exemplary embodiment of the present disclosure will be described with reference to the drawings. However, an unnecessarily detailed description may be eliminated. For example, the detailed description of already well-known matters and the redundant description of a configuration substantially identical to the already-described configuration may be eliminated. This is to avoid unnecessary redundancy in the following description and to facilitate understanding of those skilled in the art.

Note that the attached drawings and the following description are provided for those skilled in the art to fully understand the present disclosure, and are not intended to limit the subject matter described in the appended claims.

Hereinafter, an optical member driving device according to one exemplary embodiment of the present disclosure will be described with reference to the drawings.

Figure 1:
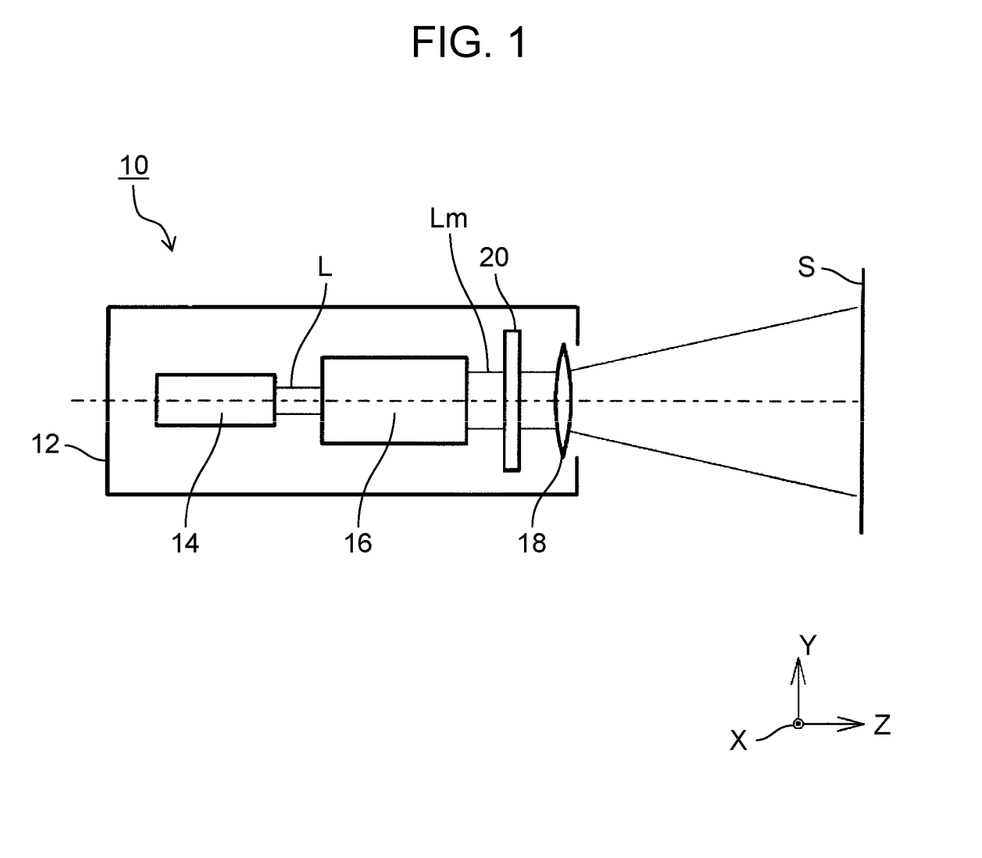
FIG. 1 is a schematic configuration diagram of a projection display apparatus as an example provided with an optical member driving device according to one exemplary embodiment of the present disclosure.

FIG. 1 is a schematic configuration diagram of a projection display apparatus as an example provided with an optical member driving device according to an exemplary embodiment of the present disclosure. Note that an XYZ Cartesian coordinate system illustrated in FIG. 1 is for facilitating understanding of the exemplary embodiment of the present disclosure and does not limit the exemplary embodiment. In the XYZ Cartesian coordinate system, an X-axis direction indicates a width direction of an image projected by the projection display apparatus, a Y-axis direction indicates a height direction of the image, and a Z-axis direction indicates a projection direction of the projection display apparatus.

As illustrated in FIG. 1, projection display apparatus 10 as an example includes housing 12, light source 14 provided in housing 12, light modulation element 16 that is provided in housing 12 and converts light L from light source 14 into image light Lm, and projection lens 18 that projects the image light on screen S. Optical member driving device 20 is disposed between light modulation element 16 and projection lens 18. Note that projection display apparatus 10 includes optical members (not illustrated) such as mirrors and prisms between light source 14 and light modulation element 16 and between light modulation element 16 and optical member driving device 20.

Figure 2:
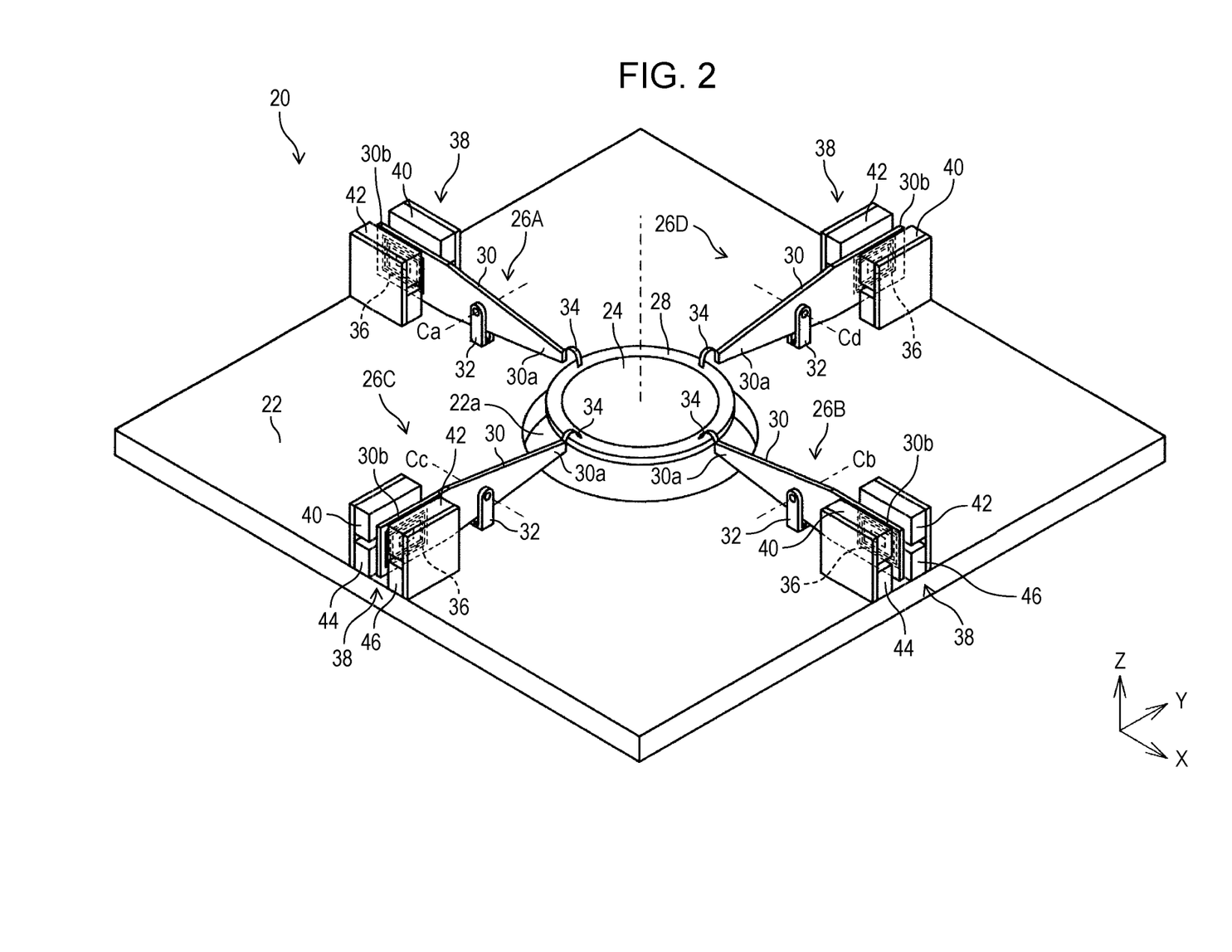
FIG. 2 is a perspective view of the optical member driving device according to one exemplary embodiment.
Figure 3:
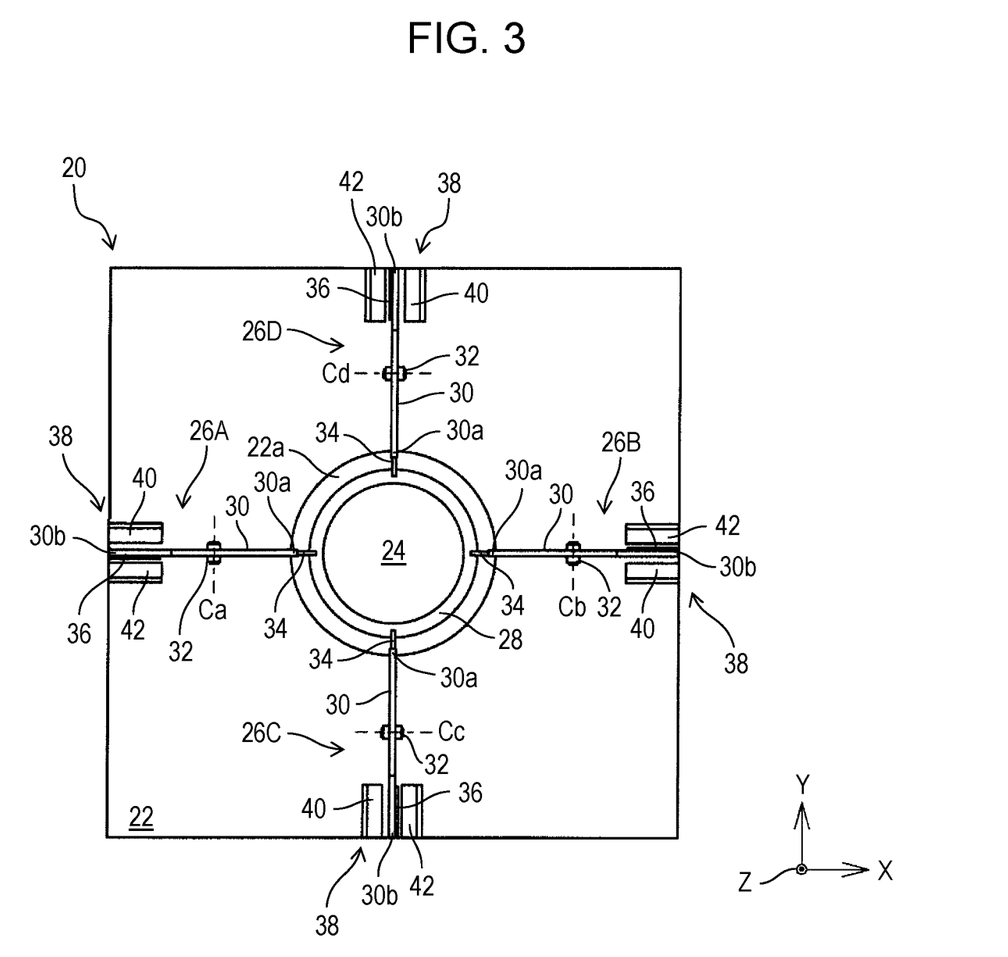
FIG. 3 is a top view of the optical member driving device.
Figure 4:
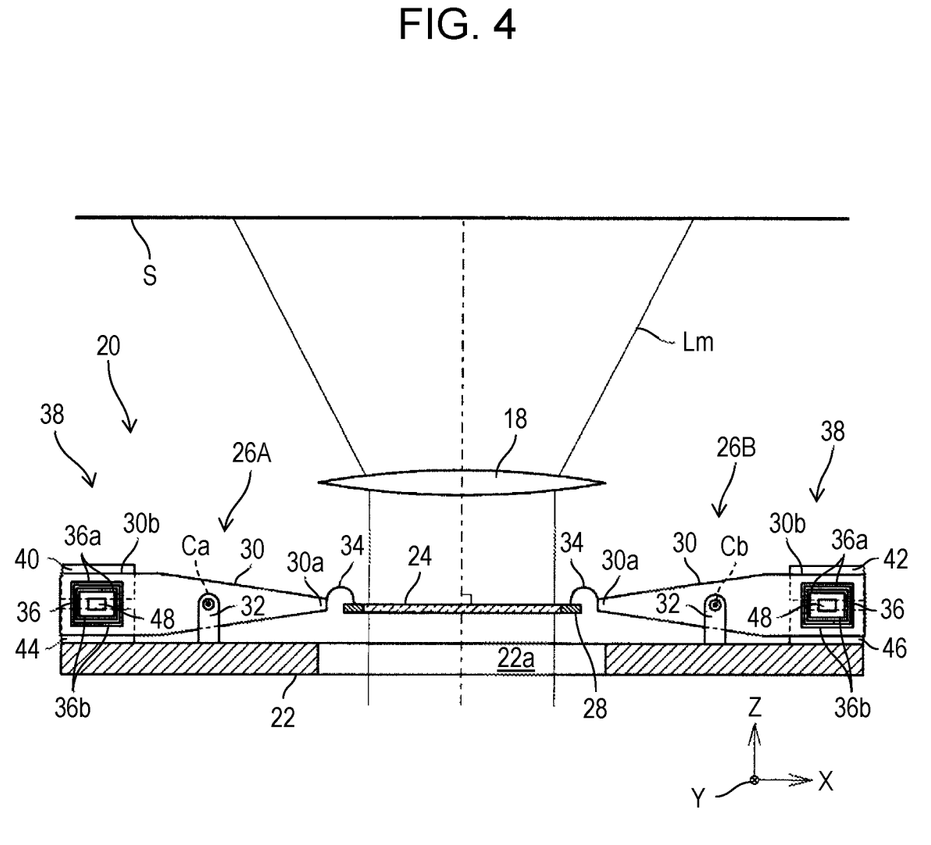
FIG. 4 is a partial cross-sectional view of the optical member driving device in a state where image light is transmitted.

FIG. 2 is a perspective view of the optical member driving device according to one exemplary embodiment. FIG. 3 is a top view of the optical member driving device, and FIG. 4 is a partial cross-sectional view of the optical member driving device in a state where image light is transmitted.

As illustrated in FIG. 3, optical member driving device 20 includes base 22, optical member 24 on which image light Lm is incident, and a plurality of actuators 26A to 26D that change the orientation of optical member 24.

Base 22 of optical member driving device 20 functions as a bracket for attaching optical member driving device 20 to housing 12 of projection display apparatus 10. Base 22 includes a through hole 22a through which the image light from light modulation element 16 passes.

In the case of the present exemplary embodiment, optical member 24 is parallel plate glass through which image light Lm having passed through through-hole 22a of base 22 is transmitted. As illustrated in FIG. 3, optical member 24 has a circular shape as viewed in the traveling direction (Z-axis direction) of image light Lm immediately before its incidence on optical member 24, and is attached to support frame 28.

The plurality of actuators 26A to 26D are provided on base 22 and support support frame 28 to which optical member 24 is attached. Note that the plurality of actuators 26A to 26D have substantially the same configuration.

Each of the plurality of actuators 26A to 26D includes arm 30 and bearing 32 that rotatably supports arm 30.

Arm 30 of each of the plurality of actuators 26A to 26D includes one end 30a (a first end) that supports optical member 24 and other end 30b (a second end). Arm 30 is rotatably supported by bearing 32 at a portion between one end 30a and other end 30b. Specifically, respective arms 30 of the plurality of actuators 26A to 26D rotate about rotation center lines Ca to Cd extending in a direction perpendicular to the traveling direction (Z-axis direction) of image light Lm immediately before its incidence on optical member 24 as rotation axes. In the case of the present exemplary embodiment, rotation center lines Ca, Cb of arms 30 of actuators 26A, 26B are parallel to each other, and rotation center lines Cc, Cd of arms 30 of actuators 26C, 26D are parallel to each other.

As illustrated in FIG. 3, one end 30a of arm 30 of each of the plurality of actuators 26A to 26D supports a different portion of the outer peripheral edge of optical member 24. In the case of the present exemplary embodiment, one end 30a of arm 30 of each of the plurality of actuators 26A to 26D supports a different portion of support frame 28 that supports optical member 24. In the case of the present exemplary embodiment, the plurality of actuators 26A to 26D are provided at intervals of 90 degrees as viewed in the traveling direction (Z-axis direction) of image light Lm immediately before its incidence on optical member 24. That is, actuators 26A, 26B face each other in the width direction (X-axis direction) with optical member 24 interposed therebetween, and actuators 26C, 26D face each other in the height direction (Y-axis direction) with optical member 24 interposed therebetween.

In the case of the present exemplary embodiment, as illustrated in FIG. 2, one end 30a of arm 30 of each of the plurality of actuators 26A to 26D supports optical member 24 via elastic member 34. Elastic member 34 is, for example, a U-shaped spring. Instead of elastic member 34, one end 30a of arm 30 and support frame 28 of optical member 24 may be connected via a ball joint or the like.

Each of the plurality of actuators 26A to 26D includes conductor 36 through which a current flows and magnetic field generation unit 38 that generates a magnetic field.

As illustrated in FIG. 4, conductor 36 is provided at other end 30b corresponding to the point of force of arm 30 of each of the plurality of actuators 26A to 26D. In the case of the present exemplary embodiment, conductor 36 is a coil including a winding axis parallel to each of rotation center lines Ca to Cd of arm 30. Conductor 36 includes a plurality of first linear portions 36a extending from other end 30b toward one end 30a of arm 30, and a plurality of second linear portions 36b extending parallel to the first linear portions 36a. Therefore, when a current flows through conductor 36, a direction in which the current flows in first linear portion 36a is opposite to a direction in which the current flows in second linear portion 36b.

Figure 5:
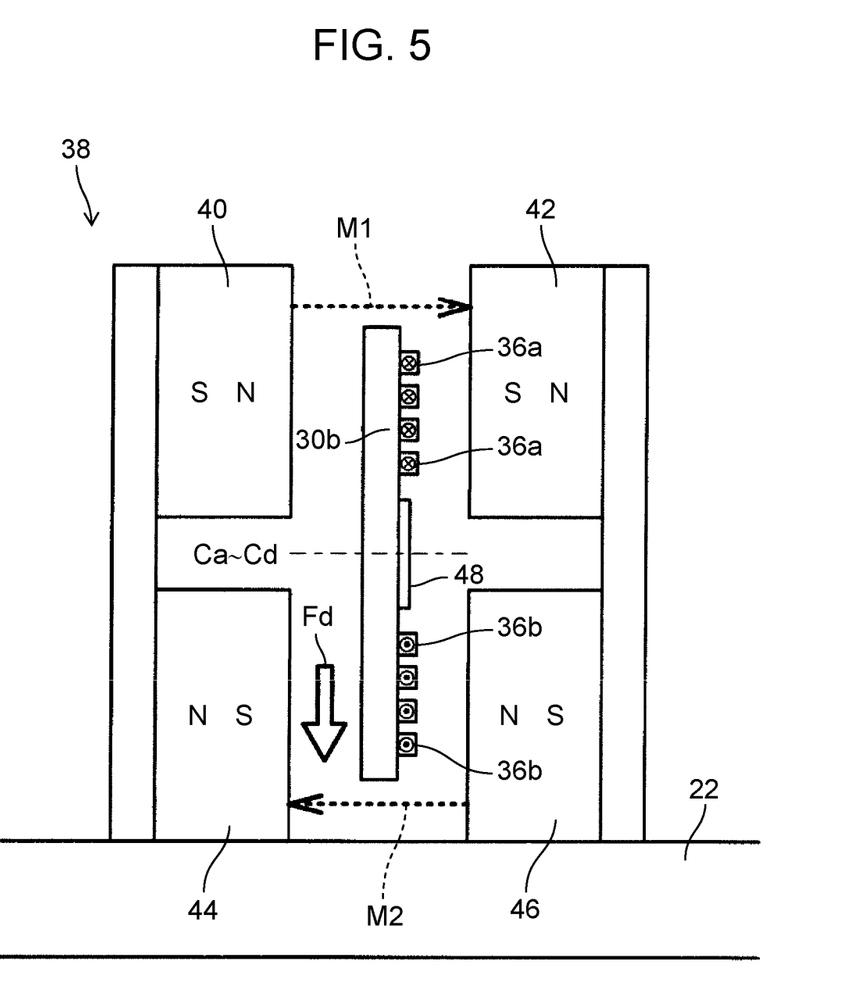
FIG. 5 is a diagram illustrating a structure of a magnetic field generation unit.

FIG. 5 is a diagram illustrating a structure of a magnetic field generation unit.

As illustrated in FIG. 5, magnetic field generation unit 38 includes a plurality of magnets 40 to 46. In the present exemplary embodiment, magnets 40, 42 form a pair (first magnet pair), and magnets 44, 46 form a pair (second magnet pair).

The pair of magnets 40, 42 is provided to sandwich other end 30b of arm 30 at an interval. Thereby, the plurality of first linear portions 36a of conductor 36 provided at other end 30b of arm 30 are present between magnets 40, 42. In the case of the present exemplary embodiment, the pair of magnets 40, 42 in each of the plurality of actuators 26A to 26D is disposed to face each other in the extending direction of rotation center lines Ca to Cd of arm 30. As a result, the pair of magnets 40, 42 generates magnetic field M1 in a direction intersecting with the extending direction of first linear portion 36a.

The pair of magnets 44, 46 is provided to sandwich other end 30b of arm 30 at an interval. Thereby, a plurality of second linear portions 36b of conductor 36 provided at other end 30b of arm 30 are present between the magnets 44, 46. In the case of the present exemplary embodiment, the pair of magnets 44, 46 in each of the plurality of actuators 26A to 26D is disposed to face each other in the extending direction of rotation center lines Ca to Cd of arm 30. As a result, the pair of magnets 44, 46 generates magnetic field M2 in a direction intersecting with the extending direction of second linear portion 36b. In the present exemplary embodiment, magnet 44 is disposed with an interval in the projection direction (Z-axis direction) with respect to magnet 40, and magnet 46 is disposed with an interval in the projection direction with respect to magnet 42.

As illustrated in FIG. 5, the direction of magnetic field M1 generated by the pair of magnets 40, 42 and the direction of magnetic field M2 generated by the pair of magnets 44, 46 are opposite to each other. Thus, when a current flows through conductor 36, a driving force acts on other end 30b of arm 30.

For example, when a control device (not illustrated) of projection display apparatus 10 supplies a current to conductor 36 in actuator 26A, as illustrated in FIG. 5, a current flows through the plurality of first linear portions 36a of conductor 36, and a current also flows through second linear portion 36b. At this time, currents in directions opposite to each other flow through first linear portion 36a and second linear portion 36b. In FIG. 5, a current flowing in the depth direction from the front of the drawing flows through first linear portion 36a, and a current flowing in the opposite direction flows through second linear portion 36b.

According to Fleming's left-hand rule, a force in a direction approaching base 22 is applied to first linear portion 36a of conductor 36 in magnetic field M1. Similarly, a force in a direction approaching base 22 is also applied to second linear portion 36b of conductor 36 in magnetic field M2 in a direction opposite to the direction of magnetic field M1. Thereby, driving force Fd for shifting other end 30b toward base 22 is generated at other end 30b of arm 30. As a result, arm 30 rotates about rotation center line Ca. When a current in the opposite direction flows through conductor 36, a driving force in the opposite direction (a direction in which other end 30b is separated from base 22) is generated.

In the case of the present exemplary embodiment, Hall sensor 48 is provided in arm 30 of each of the plurality of actuators 26A to 26D. Specifically, as illustrated in FIG. 4, Hall sensor 48 is provided at other end 30b of arm 30 so as to be located between magnets 40, 44 (between magnets 42, 46) as viewed in the extending direction of each of rotation center lines Ca to Cd of arm 30 when no current is flowing through conductor 36. Thus, when no current is flowing through conductor 36, Hall sensor 48 is present at a position between magnetic field M1 and magnetic field M2, that is, at a position where magnetic fields M1, M2 cancel each other. When a current is flowing through conductor 36, the current approaches one of magnetic fields M1, M2. Therefore, the control device (not illustrated) of projection display apparatus 10 can confirm the inclination state of arm 30 on the basis of the detection value of the magnetic field of Hall sensor 48.

The configuration of optical member driving device 20 has been described so far. The operation of optical member driving device 20 will be described below.

Figure 6A:
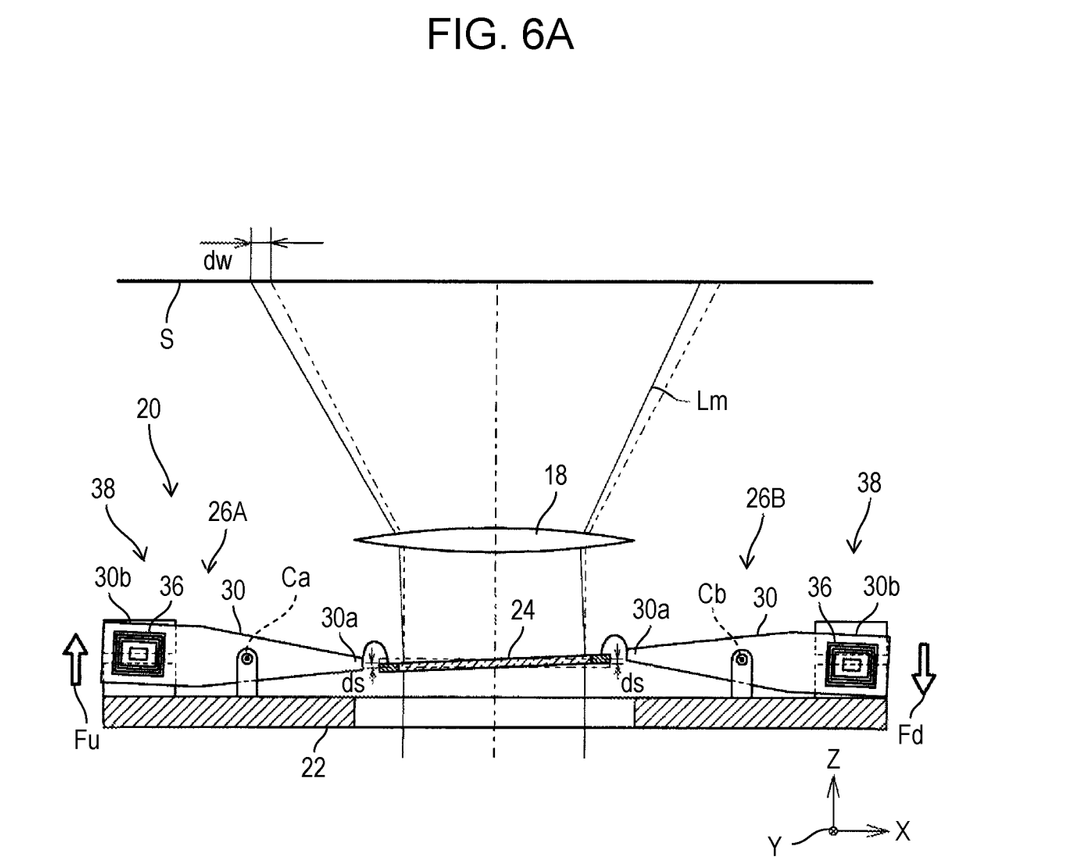
FIG. 6A is a partial cross-sectional view of the optical member driving device in a state where image light is shifted to one side in a width direction.
Figure 6B:
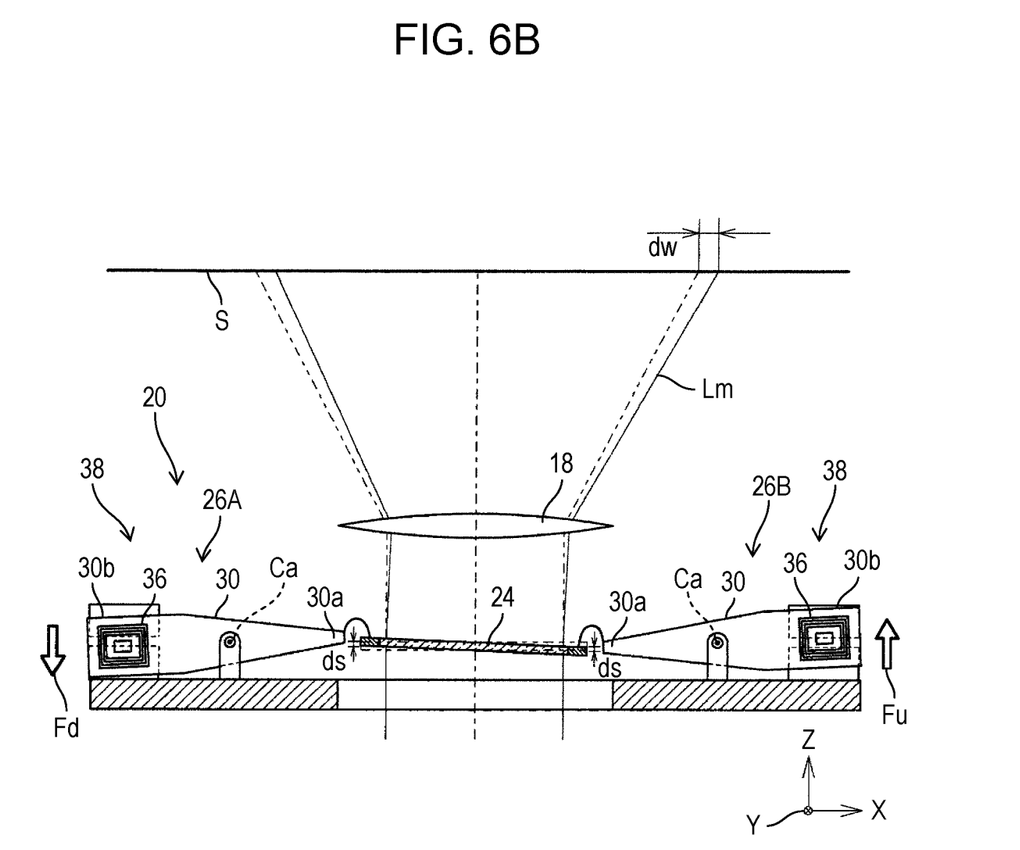
FIG. 6B is a partial cross-sectional view of the optical member driving device in a state where the image light is shifted to the other side in the width direction.

FIG. 6A is a partial cross-sectional view of the optical member driving device in a state where the image light is shifted to one side in the width direction. FIG. 6B is a partial cross-sectional view of the optical member driving device in a state where the image light is shifted to the other side in the width direction.

As illustrated in FIGS. 6A and 6B, the control device (not illustrated) of projection display apparatus 10 performs synchronization control on actuators 26A, 26B and performs a similar synchronization control on actuators 26C, 26D. Therefore, the operations of the actuators 26A, 26B will be described in detail, and the description of the operations of the actuators 26C, 26D will be omitted.

As illustrated in FIG. 6A, the control device (not illustrated) of projection display apparatus 10 outputs a control current to conductor (coil) 36 of each of actuators 26A, 26B in order to shift image light Lm to the side of actuator 26A (the left side in the drawing) by a distance dw in the width direction (X-axis direction).

When a current flows through conductor 36 of actuator 26A, driving force Fu is generated, arm 30 of actuator 26A rotates about rotation center line Ca (rotates clockwise in the drawing), and other end 30b is shifted in a direction away from base 22. As a result, one end 30a of arm 30 of actuator 26A approaches base 22, and the portion of optical member 24 supported by one end 30a is shifted in a direction approaching base 22 by distance ds.

At the same time, when a current flows through conductor 36 of actuator 26B, driving force Fd is generated, arm 30 of actuator 26B rotates about rotation center line Cb (rotates clockwise in the drawing), and other end 30b is shifted in a direction approaching base 22. As a result, one end 30a of arm 30 of actuator 26B is separated from base 22, and the portion of optical member 24 supported by one end 30a is shifted in a direction away from base 22 by distance ds.

By such synchronous operation of actuators 26A, 26B, optical member 24 is inclined to the side of actuator 26A (the left side in the drawing) from the neutral state illustrated in FIG. 4. As a result, image light Lm is shifted to the side of actuator 26A (the left side in the drawing) by distance dw in the width direction (X-axis direction).

Further, as illustrated in FIG. 6B, the control device (not illustrated) of projection display apparatus 10 outputs a control current to conductor (coil) 36 of each of actuators 26A, 26B in order to shift image light Lm to the side of actuator 26B (the right side in the drawing) by distance dw in the width direction (X-axis direction).

When a current flows through conductor 36 of actuator 26A, driving force Fd is generated, arm 30 of actuator 26A rotates about rotation center line Ca (rotates counterclockwise in the drawing), and other end 30b is shifted in a direction approaching base 22. As a result, one end 30a of arm 30 of actuator 26A is separated from base 22, and the portion of optical member 24 supported by one end 30a is shifted in a direction away from base 22 by distance ds.

At the same time, when a current flows through conductor 36 of actuator 26B, driving force Fu is generated, arm 30 of actuator 26B rotates about rotation center line Cb (rotates counterclockwise in the drawing), and other end 30b is shifted in a direction away from base 22. As a result, one end 30a of arm 30 of actuator 26B approaches base 22, and the portion of optical member 24 supported by one end 30a is shifted in a direction approaching base 22 by distance ds.

By such synchronous operation of actuators 26A, 26B, optical member 24 is inclined to the side of actuator 26B (the right side in the drawing) from the neutral state illustrated in FIG. 4. As a result, image light Lm is shifted to the side of actuator 26B (the right side in the drawing) by distance dw in the width direction (X-axis direction).

The control device (not illustrated) of projection display apparatus 10 alternately and repeatedly executes the operations of actuators 26A, 26B illustrated in FIGS. 6A and 6B at high speed. At the same time, the control device executes similar repetitive high-speed operations of actuator 26C and actuator 26D. Thus, the control device of projection display apparatus 10 quadruples the density of pixels of a video projected on screen S. Specifically, by the high-speed repetitive operation of actuators 26A, 26B, 26C, 26D described above, optical member 24 is sequentially inclined at high speed in four directions corresponding to each side of actuators 26A, 26B, 26C, and 26D. Thereby, four images shifted by ½ of the pixels in the width direction (X-axis direction) and the height direction (Y-axis direction) from optical member 24 are output substantially at the same time (i.e., distance dw is ¼ of the pixel). As a result, the resolution of the video projected on screen S is increased.

According to the exemplary embodiment as described above, it is possible to reduce the size of optical member driving device 20 that changes the orientation of optical member 24. In particular, the size in the traveling direction (Z-axis direction) of image light Lm immediately before its incidence on optical member 24 can be reduced. This enables a decrease in space between light modulation element 16 in which optical member driving device 20 is disposed and projection lens 18, which results in a reduction in the size of projection display apparatus 10.

Although the present disclosure has been described above by taking the above exemplary embodiment as an example, the present disclosure is not limited thereto.

For example, in the case of the above exemplary embodiment, as illustrated in FIG. 3, arm 30 of each of the plurality of actuators 26A to 26D extends linearly in a radial direction of circular optical member 24. However, the exemplary embodiment of the present disclosure is not limited thereto.

Figure 7:
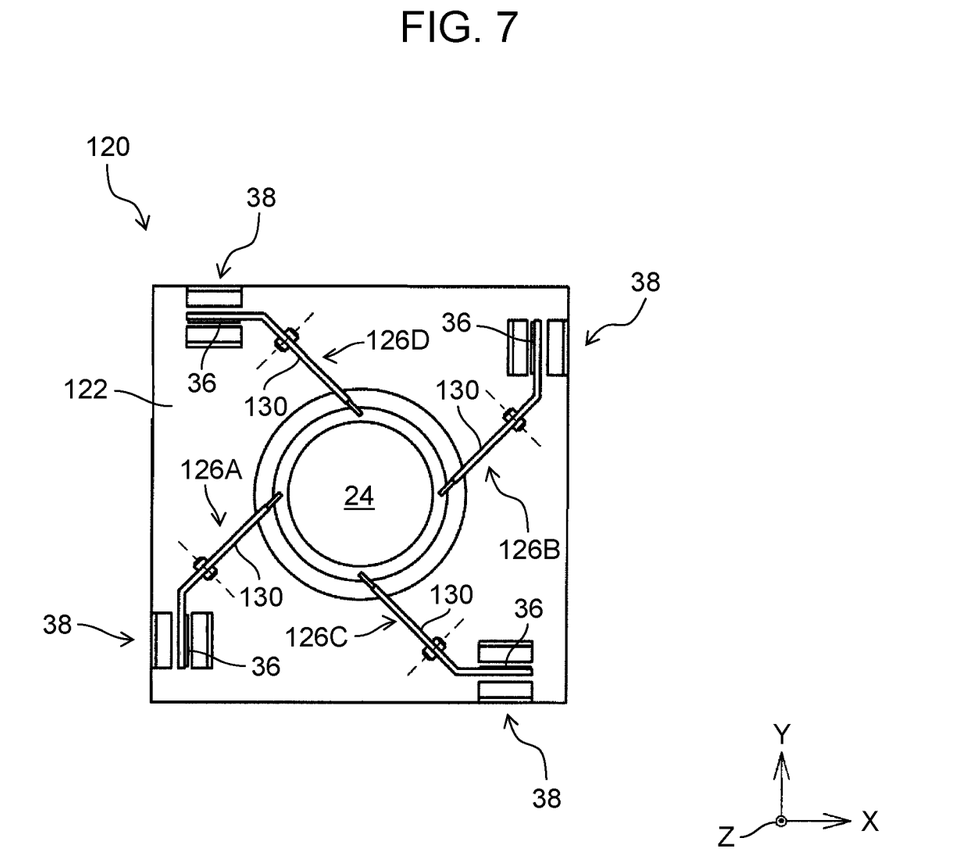
FIG. 7 is a top view of an optical member driving device according to another exemplary embodiment.

FIG. 7 is a top view of an optical member driving device according to another exemplary embodiment.

As illustrated in FIG. 7, in optical member driving device 120 according to another exemplary embodiment, arm 130 of each of a plurality of actuators 126A to 126D extends in a tangential direction of circular optical member 24 and bends. Even with such arm 130, the orientation of optical member 24 can be changed in the same manner as arm 30 in the above exemplary embodiment. Further, with such arm 130, it is possible to reduce the size of base 122, in particular, the size in the width direction (X-axis direction) and the height direction (Y-axis direction). That is, it is possible to reduce the sizes of optical member driving device 120 and the projection display apparatus including the optical member driving device 120.

Further, in the case of the above exemplary embodiment, as illustrated in FIG. 2, the optical member driving device includes four actuators 26A to 26D. However, the exemplary embodiment of the present disclosure is not limited thereto. For example, even three actuators can incline the optical member in four directions.

Moreover, in the case of the above exemplary embodiment, as illustrated in FIG. 4, conductor 36 that generates the driving force for shifting other end 30b of arm 30 is a coil, but the exemplary embodiment of the present disclosure is not limited thereto. That is, the conductor is not limited to a coil so long as a current flows in the direction intersecting with the direction of the magnetic field.

Furthermore, in the case of the above exemplary embodiment, as illustrated in FIG. 4, optical member 24, the orientation of which is changed by optical member driving device 20, is parallel plate glass. However, the exemplary embodiment of the present disclosure does not limit the optical member to parallel plate glass. The optical member may be a mirror that reflects incident light.

In addition, in the case of the above exemplary embodiment, as illustrated in FIG. 1, optical member driving device 20 is used for projection display apparatus 10. However, the exemplary embodiment of the present disclosure is not limited thereto. The optical member driving device can be used for a device other than the projection display apparatus, that is, a device in which the orientation of the optical member needs to be changed.

That is, in a broad sense, an exemplary embodiment of the present disclosure is an optical member driving device according to an aspect of the present disclosure includes: an optical member on which light is incident; a plurality of actuators that shift different portions of an outer peripheral edge of the optical member in a traveling direction of the light immediately before the light is incidence on the optical member. Each of the plurality of actuators includes an arm that rotates about a rotation center line extending in a direction perpendicular to the traveling direction and supports the optical member at a first end of the arm, a conductor that is provided at a second end of the arm and extends in a direction from the second end toward the first end of the arm, and through which a current flows, and a magnet pair that is provided to sandwich the second end of the arm at an interval and generates a magnetic field in a direction intersecting with a direction where the conductor extends.

Furthermore, in a broad sense, another exemplary embodiment of the present disclosure is a projection display apparatus including: a light source; a light modulation element that converts light from the light source into image light; the optical member driving device described above on which the image light from the light modulation element is incident; and a projection lens that projects the image light emitted from the optical member driving device.

As described above, the above exemplary embodiment has been described as examples of the techniques in the present disclosure. To this end, the drawings and detailed description are provided. Thus, in order to exemplify the technique described above, the components illustrated in the drawings and described in the detailed description include not only components essential for solving the problem but also components not essential for solving the problem. Therefore, the fact that such non-essential components are illustrated in the drawings or described in the detailed description should not immediately determine that these non-essential components are essential.

Since the above exemplary embodiment is for exemplifying the techniques in the present disclosure, various changes, replacements, additions, omissions, and the like can be made within the scope of the appended claims or the scope equivalent thereto.

The present disclosure is applicable to a device in which the orientation of the optical member needs to be changed.

What is claimed is:

1. An optical member driving device comprising:
an optical member that light is incident on;
a plurality of actuators that shift different portions of an outer peripheral edge of the optical member in a traveling direction of the light immediately before the light is incident on the optical member,
wherein
each of the plurality of actuators includes
an arm that rotates about a rotation center line extending in a direction perpendicular to the traveling direction and supports the optical member at a first end of the arm,
a conductor that is provided at a second end of the arm and extends in a direction from the second end toward the first end of the arm, the conductor being where a current flows, and
at least one magnet pair that is provided to sandwich the second end of the arm at an interval and generates a magnetic field in a direction intersecting with a direction where the conductor extends, and
wherein the conductor is a coil.

2. The optical member driving device according to claim 1, wherein
the coil includes a first linear portion extending with a directional component in the direction from the second end to the first end of the arm.

3. The optical member driving device according to claim 2, wherein
the coil includes a second linear portion extending parallel to the first linear portion, and
the at least one magnet pair includes a first magnet pair that is provided to sandwich the first linear portion and generates a magnetic field in a direction intersecting with an extending direction of the first linear portion, and a second magnet pair that is provided to sandwich the second linear portion and generates a magnetic field in a direction opposite to the direction of the magnetic field of the first magnet pair.

4. The optical member driving device according to claim 1, further comprising an elastic member that is connected to the first end of the arm and supports the optical member.

5. The optical member driving device according to claim 1, wherein
the optical member has a circular shape as viewed in the traveling direction, and
the plurality of actuators are provided at intervals of 90 degrees as viewed in the traveling direction.

6. The optical member driving device according to claim 1, wherein the optical member is parallel plate glass that light is transmitted through.

7. A projection display apparatus comprising:
a light source;
a light modulation element that converts light from the light source into image light;
the optical member driving device according to claim 1 that the image light from the light modulation element is incident on; and
a projection lens that projects the image light emitted from the optical member driving device.

8. An optical member driving device comprising:
an optical member that light is incident on;
a plurality of actuators that shift the optical member in a traveling direction of the light immediately prior to the light being incident on the optical member,
wherein
each of the plurality of actuators includes
an arm that rotates about a rotation center line extending in a direction perpendicular to the traveling direction and supports the optical member at a first end side of the arm, and
a coil that is provided at a second end side of the arm,
the coil includes a first linear portion extending with a directional component in the direction from the second end side to the first end side of the arm,
each of the plurality of actuators further includes at least one magnet pair that is provided to sandwich the second end side of the arm at an interval and generates a magnetic field in a direction intersecting with a direction where the coil extends,
the coil includes a second linear portion extending parallel to the first linear portion, and
the at least one magnet pair includes a first magnet pair that is provided to sandwich the first linear portion and generates a magnetic field in a direction intersecting with an extending direction of the first linear portion, and a second magnet pair that is provided to sandwich the second linear portion and generates a magnetic field in a direction opposite to the direction of the magnetic field of the first magnet pair.

9. An optical member driving device comprising:
an optical member that light is incident on;
a plurality of actuators that shift different portions of an outer peripheral edge of the optical member in a traveling direction of the light immediately prior to the light being incident on the optical member,
wherein
each of the plurality of actuators includes
an arm that rotates about a rotation center line extending in a direction intersecting with a direction including the traveling direction and supports the optical member at a first end side of the arm,
a conductor that is provided at a second end side of the arm, the conductor being where a current flows, and
a magnet that is provided at the second end side of the arm and generates a magnetic field in a direction intersecting with a direction where the conductor extends, and
wherein the conductor is a coil.

10. The optical member driving device according to claim 9, wherein a winding axis of the coil is substantially parallel to an incidence surface of the optical member.

11. The optical member driving device according to claim 10, wherein
the winding axis extends in a first direction,
the incidence surface is a surface that light is incident on, and
the incidence surface is on a plane defined by a second direction parallel to the first direction and a third direction intersecting with both the first and second directions.

12. The optical member driving device according to claim 10, wherein a plane intersecting with the winding axis is a plane defined by a direction in which the optical member is provided relative to the coil and the traveling direction of the light.

13. The optical member driving device according to claim 10, wherein
a shape of the coil has a longitudinal direction and a transverse direction, and
the longitudinal direction is a direction intersecting with the traveling direction of the light.

* * * * *